United States Patent [19]

Oberg

[11] Patent Number: 4,926,690
[45] Date of Patent: May 22, 1990

[54] PENDULOUS ACCELEROMETER AND/OR INCLINOMETER

[76] Inventor: Paul E. Oberg, 3231 Forest Crest Dr., Minneapolis, Minn. 55431

[21] Appl. No.: 164,558

[22] Filed: Mar. 7, 1988

[51] Int. Cl.$^5$ ............................................. G01P 33/401
[52] U.S. Cl. ........................................... 73/514; 33/401
[58] Field of Search .................... 73/493, 495, 514; 33/401

[56] References Cited

U.S. PATENT DOCUMENTS

| | | | |
|---|---|---|---|
| 1,624,219 | 4/1927 | Cowdrey | 73/493 |
| 2,149,401 | 3/1939 | Mason | 73/495 |
| 2,154,678 | 4/1939 | Hawthorne et al. | 73/495 |
| 2,464,911 | 3/1949 | White | 33/401 |
| 2,565,615 | 8/1951 | McCoy | 33/401 |
| 2,782,525 | 2/1957 | Eubank | 33/401 |
| 3,377,714 | 4/1968 | Carlson | 33/401 |
| 3,378,932 | 4/1968 | Neill | 33/401 |
| 3,395,583 | 8/1968 | Bartholomew, Jr. | 73/514 |
| 4,426,788 | 1/1984 | Hirose et al. | 33/401 |

OTHER PUBLICATIONS

J. C. Whitney, *Parts & Accessories Catalog*, No. 499J, 1988, p. 41.

Primary Examiner—John Chapman
Assistant Examiner—Robert P. Bell
Attorney, Agent, or Firm—Dressler, Goldsmith, Shore, Sutker & Milnamow, Ltd.

[57] ABSTRACT

A motion of a first pendulous mass responsive to combinatorial gravitation and acceleration force vectors in a first plane is kinetmatically coupled to cause displacement of an indicator needle in a second plane that is orthogonal to the first plane. Also in an accelerometer-/inclinometer, a second pendulous mass moves responsively to combinatorial force vectors in the second plane, and causes displacement of another indicator needle in this same second plane. The first plane is nominally aligned longitudinally in a vehicle while the second plane is aligned laterally. By this alignment each of the longitudinal, or fore-aft, and the lateral, or side-to-side, combinatorial tilts and accelerations of the vehicle are displayed.

23 Claims, 5 Drawing Sheets

FIG. 9
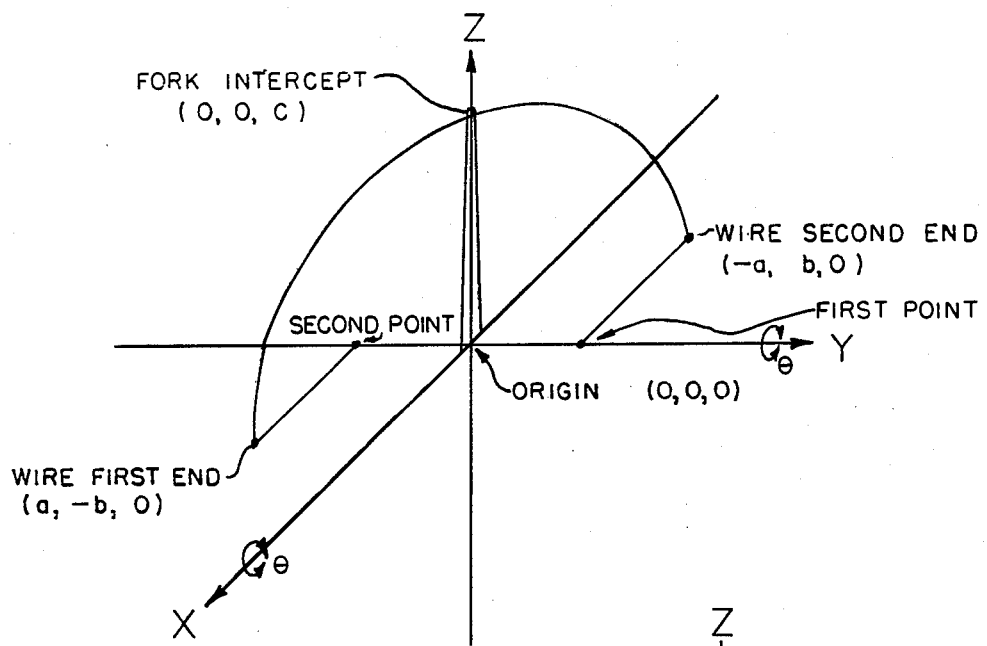
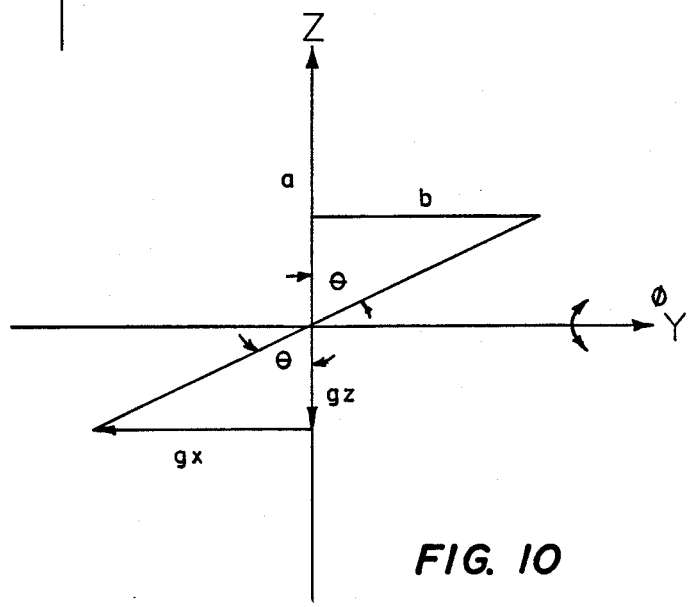
FIG. 10

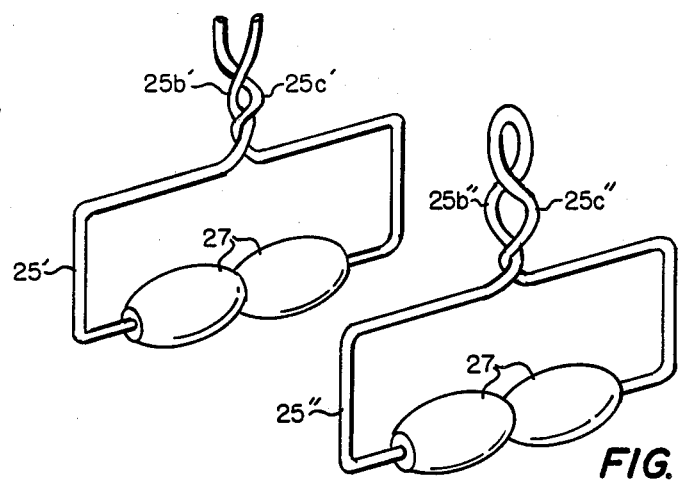
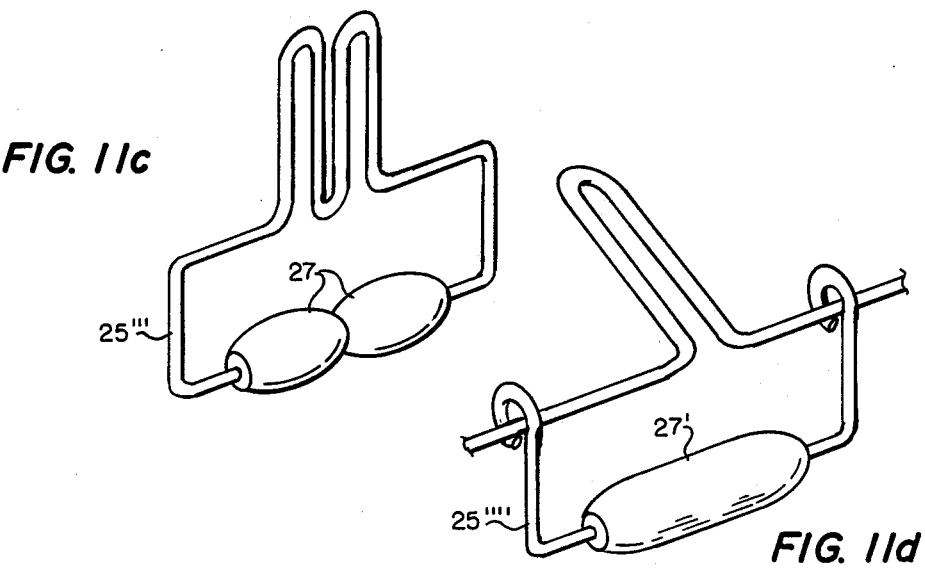

PENDULOUS ACCELEROMETER AND/OR INCLINOMETER

BACKGROUND OF THE INVENTION

1. Field of the Invention

The present invention generally concerns kinematic mechanical space, or three-dimensional, mechanisms for translating motion, particularly angular rotational motion, transpiring in a one plane into a corresponding motion in another, orthogonal, plane. In particular, the present invention concerns rotational motion translation mechanisms particulary for use in pendulous accelerometers and inclinometers, and the accelerometers and inclinometers so formed.

2. Description of the Relevant Art

Kinematic mechanical space, or three-dimensional, mechanisms for translating motion in three dimensions are known in the prior art. A planar antecedent to a certain particular one of these mechanisms is called a four link mechanism. This planar mechanism consists of a rotating driving, or input, crank connecting through a connecting rod to an oscillating rocker, all substantialy in a single plane. The conic, or spherical, three-dimensional form of this four link mechanism employs a rotating input crank connected by an arcuate connecting rod to an oscillating rocker. A modified form of this conic linkage may employ extended pin connections. Another prior art planar antecedent to a certain particular three-dimensional kinematic space mechanism is represented by the planar mechanism of a slider-crank. Within this planar mechanism a rotating, driving, input, crank connects through a connecting rod to a slider, all of the crank, rod, and slider being substantially in one plane. The three-dimensional form of this mechanism is a conic slider-crank.

These prior art kinematic space mechanisms are capable, when constructed with appropriately robust components, of transmitting significant torque and power. Transmission of high levels of torque and power is not a primary concern of the kinematic mechanism in accordance with the present invention. These prior art kinematic mechanisms use bearings, cranks, and connecting rods which are precision fabricated, and costly. The kinematic mechanism in accordance with the present invention may be formed entirely of bent or angled braising rod, welding rod, or simple wire. Bearings are only optionally employed, and are not employed in the preferred embodiment of the invention. Consequently, the kinematic mechanism in accordance with the present invention is very simple of construction, and inexpensive, relative to those prior art mechanisms which generally transmit much greater forces.

Similarly to the prior art kinematic mechanisms, the present invention will be seen to translate motion, particularly rotational motion, at a variably preselected, variably predetermined, transfer function. Within the prior art a realization of some particular transfer function required the custom fabrication of connecting linkages, gears, and the like. However, the physical realization of a predetermined and preselected transfer function is of improved simplicity within the kinematic mechanism of the present invention, basically involving only the creation of a bent wire(s) of and at a particular contour.

Prior art kinematic mechanisms often exhibit considerable friction in their movements. These movements often involve robust components of considerable mass which are often reciprocating, and therefore consume considerable energy. In contrast, a mechanical coupling within the kinematic mechanism in accordance with the present invention will occur when two wires, which may be lubricated, slide by each other. Accordingly, friction is very low. This low friction proves useful in a preferred application of kinematic mechanism in accordance with the present invention within accelerometers and inclinometers.

The prior art regarding accelerometers and inclinometers is also of importance relative to the present invention. A pendulous accelerometer is a well known prior art mechanism in which a pendulous mass is suspended to pivot in one or more axis of freedom. The motion of the pendulous mass is subject to the gravitational, as well as to the acceleration, forces. Consequently, a pendulous accelerometer also serves as a inclinometer. The motion of the pendulous mass is detected, and used to generate a display which is indicative of inclination and acceleration. Normally the motion detection transpires along each of a plurality of orthogonal axis.

Four areas wherein the mechanical construction of prior art accelerometers and inclinometer may be compared, or contrasted, with the accelerometer and inclinometer in accordance with the present invention include (i) the mechanical suspension of a mass for motion; (ii) the detection of motion and/or inclination of the suspended mass; (iii) the display, including the mechanical display, of the detected motion and/or inclination; and (iv) the coupling of the detection into the display.

In the first area it is known in the prior art to suspend masses for pivoting in a plane like a pendulum. A similar suspension is employed in the accelerometer and inclinometer in accordance with the present invention. The suspension of masses within the accelerometer and inclinometer in accordance with the present invention will be found to be somewhat simplified, and consequently somewhat rudimentary, in comparison to certain high performance precision accelerometers and inclinometers of the prior art. Particularly in such high performance prior art accelerometers and inclinometers, it is of considerable importance that a pendulous mass should experience a low friction freedom of movement. One electrical scheme for detecting the position of the pendulous mass with minimal restriction or friction on its motional freedom is to emit a light beam from the radius end of the pendulous mass. This light beam travels through space and intercepts a spatially extended array of light detectors disposed oppositely to the light-emitting end of the pendulum. Thereby the position of the pendulum can be determined with no mechanical resistance. The pendulums within the accelerometer and inclinometer in accordance with the present invention do not enjoy a total absence of mechanical resistance to their pendulous movements, but they do enjoy remarkably low restriction or friction to such movements. This very low friction, or sticking, is aided by vibration of a vehicle within which the accelerometer and inclinometer containing the pendulums is intended to be installed, and by the use of lubricants. The lubricants add a small viscous damping to the pendulous movements which damping is useful in the application of the present invention. This viscous damping is common in fluid-filled inclinometer tubes but is uncommon in mechanical inclinometers and accelerometers. Within a particularly intended vehicular application of the accelerometer and inclinometer in accordance with the present invention it is of no great detriment that a pendulous mass should experience both a small frictional resistance and a viscous damping to its pivoting motion.

In the second area the accelerometer and inclinometer apparatus in accordance with the present invention will have the motion of its pendulous mass mechanically detected. In order to permit such mechanical detection the pendulous mass will be affixed firmly to a shaft along the axis about which it pivots, and will be required to overcome the inertia and frictional resistance of inducing rotation in this affixed shaft. Furthermore, still further components are mechanically linked to the pendulous mass. However, all of these components, although exhibiting inertia and although incurring friction in their movements, are extremely lightweight. The mechanically linked components produce insignificant inertial and frictional resistance to the pivoting of the pendulous mass within the intended application of the apparatus in accordance with the present invention. Accordingly, the second area is one wherein the construction of prior art pendulous accelerometers and inclinometers differs from the accelerometer and inclinometer apparatus in accordance with the present invention because such prior art accelerometers and inclinometers predominantly employ electrical, as opposed to mechanical, means for detecting motion of the pendulous mass in order that no friction or damping should be induced in such motion.

In the third area regarding the display, including the mechanical display, of detected motion, the accelerometer and inclinometer in accordance with the present invention will be seen to employ conventional mechanical pointers. These pointers are mechanically deflected relative to scales, thereby giving an analog visual indication of motion. In accelerometers and inclinometers of the multi-axis type this direct analog indicating is uncommon. Rather, motion indications are often electronic displays. The electronic displays indicate motion in both analog and digital forms. The reason that electronics indications of motion predominate over mechanical indications of motion probably has more to do with the fourth area —the mechanical coupling of detected motion into the display of such detection —then it does with avoidance of frictional losses, viscous damping, etc. which was of concern in the second area.

It is in the fourth area that the accelerometer and inclinometer in accordance with the present invention is considerably different from the prior art. The accelerometer and inclinometer in accordance with the present invention employs a particular mechanical kinematic space mechanism, which mechanism is also in accordance with the present invention. The coupling by this kinematic space mechanism into the display of such motion is entirely mechanical. Accordingly by this construction, the multi-axis accelerometer and inclinometer in accordance with the present invention is entirely mechanical. It has no necessary electrical components, yet is still highly accurate and readable in its intended applications.

Regarding the intended applications of the combination accelerometer and inclinometer in accordance with the present invention, one particular, preferred, application is for use on a land or sea vehicle, most particularly in an automobile. It is known in the prior art to measure both the lateral, or sideways, and the longitudinal, or forwards and backwards, acceleration produced by an automobile as a measurement of the performance of the automobile. Particularly, the maximum sustainable lateral acceleration in "G's" before positive control of the automobile is lost is a measurement of the cornering capability of the automobile. The measurement of longitudinal "G" force in one direction is indicative of the acceleration of the automobile, and in the opposite direction is indicative of the braking, or deceleration, of the automobile.

All these quantities are of considerable interest both to the technically-minded and to automobile enthusiasts. They are regularly included in automotive performance tests conducted by automotive magazines and the like. Accelerometers producing an electronic display of automotive lateral and longitudinal accelerational performance are currently in use by test laboratories. Automotive accelerometers are available as manufacturers' options, or as accessory add-ons, to high-performance sports cars. Some of the problems interfering with a more widespread use of accelerometers in vehicles, including automobiles, are the high cost and uncertain reliability of any electronics incorporated within these accelerometers. The entirely mechanical accelerometer in accordance with the present invention is of modest cost and highly reliable.

Further concerning intended applications of the combined accelerometer and inclinometer apparatus in accordance with the present invention, it is known to equip many kinds of vehicles from earthmoving equipments to agricultural implements to submarines with inclinometers in order to indicate the operating angles of the vehicle, and the proximity of the current angular spatial alignment of the vehicle to its design limits. Particularly for land vehicles it is useful that angular orientation of the vehicle should be indicated, and that an alarm should potentially be sounded, before the vehicle slides or tips over with attendant damage to the vehicle and hazard to its operator(s) and/or to bystanders.

SUMMARY OF THE INVENTION

The present invention concerns a kinematic mechanical space (three-dimensional) mechanism, a use of this mechanism within a combination accelerometer and inclinometer apparatus, and methods of constructing and operating both the mechanism and the apparatus.

In one respect, the present invention is embodied in a mechanism for bi-directionally translating angular rotation of a first shaft into angular rotation of a second shaft substantially perpendicular to the first shaft. Either the first shaft, or the second shaft, may be driving, or driven, but typically in a preferred application, the first shaft will be driving and the second shaft will be driven. The mechanism performs this translation by linkage of special three-dimensional regions, or extensions, upon both the first and the second shaft. The regions couple, or interlock, one to the other.

The coupling region, or extension, of each shaft traces a particular three-dimensional spatial path. For the second, driven, shaft, the path commences by proceeding essentially radially outward from the shaft's axis to a predetermined radial distance of separation therefrom. The path next proceeds approximately as a helix, meaning a curve traced on a cylinder by the rotation of a point crossing its right section at a constant oblique angle, along and upon an imaginary cylinder which is coaxial with the shaft's axis and which is of a radius substantially equal to the predetermined radial distance of the separation. At the end of the helix the path next proceeds essentially radially inward for the predetermined radial distance of separation, returning back to the axis of the second shaft. This complex spatial path is preferably implemented by means of a bent wire, which bent wire preferably also forms the second shaft itself.

Further in the kinematic mechanism in accordance with the present invention, the coupling, or extension, region of the first, driving, shaft also follows a three dimensional spatial path. The path commences near a point upon the axis of the first shaft where a second shaft would intersect save for its extension region (or near the point upon the first shaft that is the orthogonal projection of a displaced second shaft onto the first shaft). The path proceeds essentially radially outward to a distance which is greater than that predetermined radial distance of the separation whereat the helix was formed relative to the axis of the second shaft. At this greater distance of separation the path then proceeds to cross over the helix portion of the extension region of the second shaft. The path finally proceeds essentially radially inward to return to the axis of the first shaft. Again, this entire complex spatial path is preferably implemented by bent wire.

By action of the two three-dimensional paths, the three-dimensional extension region of the second shaft couples, or interlocks, the three-dimensional extension region of the first shaft (and vice versa). This interlocking makes that the angular rotation undergone by either shaft serving as a driving shaft will be translated —at a predetermined transfer function determined by the construction of the spatially extended region —into a corresponding angular rotation undergone by the other, driven, shaft.

The kinematic mechanical space mechanism so constructed is inexpensive, durable, and readily constructed at any desired degree of precision. It is capable of a completely general, but mathematically rigorous, physical transformation of the angular rotation $\theta$ of the first shaft into an angular rotation $\phi$ of the second shaft, perpendicular to the first shaft, wherein:

$$\phi = f(\theta)$$

Function f can further be in either clockwise or counterclockwise (positive or negative) rotational sense. It can incorporate a constant offset:

$$\phi = f(\theta) + c$$

Function f need not be linear and/or exclusively linear, e.g.:

$$\phi = a^2\theta + b\theta + c$$

In the preferred embodiment which particularly has a helical path for the coupling region of the second shaft, the predetermined transfer function is $$\phi \sim \tan \theta$$

The kinematic mechanical space mechanism in accordance with the present invention is embodied, as one preferred use, in a combination pendulous accelerometer and inclinometer. This accelerometer/inclinometer will indicate, by a deflection of an indicator element in an XZ plane that is parallel to the base coordinate XZ plane (the base coordinate XZ plane contains the X and Z axis), a combinatorial acceleration, and inclination, that is undergone by a pendulous mass pivoting in the YZ plane (which YZ plane is orthogonal to the XZ plane). Particularly, the pendulous mass pivoting under force(s) of acceleration or gravity in the YZ plane induces rotation of a X axis shaft (which X axis shaft is perpendicular to the YZ plane). The kinematic mechanical space mechanism in accordance with the present invention translates this rotation of the X axis shaft into a corresponding rotation of a Y axis shaft (which Y axis shaft is perpendicular to the XZ plane). An indicator element in an XZ plane that is parallel to the base coordinate XZ plane is connected to this Y axis shaft. The indicator element will undergo deflection responsive to the rotation of the Y axis shaft. This rotation is reflective at a predetermined transfer function of the combinatorial acceleration and inclination in the YZ plane of the pendulous mass. Tersely expressed, motion undergone by a mass responsive to acceleration and/or inclination in a one plane is indicated in another, orthogonal, plane.

When the pendulous accelerometer/inclinometer in accordance with the present invention is used in an automobile, the Y axis is nominally longitudinal. Accordingly, an indicator which deflects upon the face of a scale which is facing the driver will indicate, combinatorially, both the fore/aft pitch (inclination) and the fore/aft acceleration/deceleration of the vehicle. Motion undergone by a pendulous mass in the longitudinal plane, motion that is combinationally responsive to both longitudinal inclination and longitudinal acceleration, is kinematically translated so as to cause the deflection of an indicator in an orthogonal plane. This orthogonal plane faces the vehicle driver.

In an enhancement to the pendulous accelerometer/inclinometer in accordance with the present invention, another, second, pendulous mass may be pivoted about a Y axis shaft for movement in an XZ plane responsively to the combined gravitational and acceleration vectors in this plane. The rotation of the Y axis shaft induced by motion of this second pendulous mass is coupled to cause deflection in an XZ plane of still another indicator. The second pendulous mass and the indicator are preferably integrated as one unit, and are preferably implemented as a straight wire suspended for pendulous motion about a Y axis shaft. The wire serves both as pendulum and as indicator.

When the X axis is nominally transverse, or lateral, within an automobile, then this second indicator, which is also facing the driver, will indicate, combinatorially, the left/right roll and the left/right acceleration/deceleration of the automobile. The enhanced accelerometer/inclinometer in accordance with the present invention thus indicates the combinatorial gravitational and acceleration forces which act upon a vehicle in each of the two orthogonal planes. These combinatorial forces are precisely those net forces which must be compensated for by that frictional force which the vehicle experiences through its tires, or treads, with the ground.

The space mechanism, and the accelerometer/inclinometer apparatus, in accordance with the present invention are preferably implemented, in aggregate, by three pieces of bent wire, a weight suspended upon one of the wires, and a frame which is bent from a single strip of metal, and an outer housing. Extensions of two of the wire pieces form needle-type indicators which display acceleration in relative "G's" against a scale upon an outer housing. The apparatus of the present invention is correspondingly made from a small number of components and is accordingly inexpensive. It is rugged and durable. It has utility in diverse applications ranging from assessment and indication of the performance and safe operation of automobiles to indication the net forces acting on construction and agricultural equipments that are subject to being overturned on uneven ground. Additionally, the space mechanism of the present invention is itself of individual utility in diverse applications wherein motion must be spatially mechanically translated at a mathematically predetermined transfer function.

BRIEF DESCRIPTION OF THE DRAWINGS

These and other aspects and attributes of the present invention will become increasingly clear upon reference to the drawings and accompanying specification wherein:

FIG. 9 is a diagrammatic orthographic view quantizing the spatial relationship between interlocking parts within the preferred embodiment of the kinematic mechanical space mechanism in accordance with the present invention.

FIG. 10 is an orthographic view quantizing the spatial relationship between movement of parts within the preferred embodiment of the kinematic mechanical space mechanism in accordance with the present invention.

FIG. 11, consisting of FIGS. 11a through 11d, show alternative implementations of the coupling, or extension, region of a first, driving, wire within the preferred embodiment of the kinematic mechanical space mechanism in accordance with the present invention.

DESCRIPTION OF THE PREFERRED EMBODIMENT

The present invention is embodied in a mechanism and method for translating rotational motion, is further embodied in a combination pendulous accelerometer and inclinometer apparatus employing this mechanism, and is still further embodied in the method of making and using such a mechanism and such an apparatus.

Figure 1:
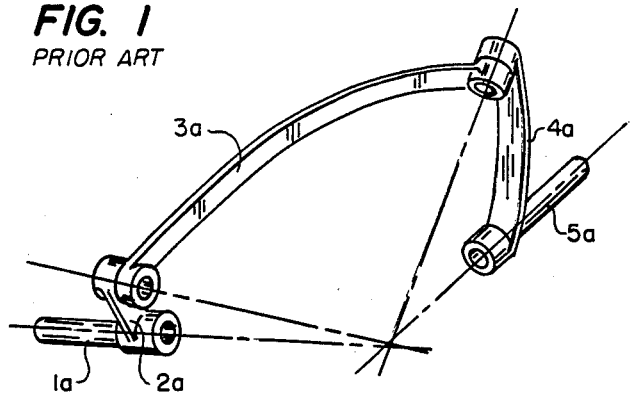
FIG. 1 is a perspective view showing a prior art conic, or spherical, form of a four link mechanism.
Figure 2:
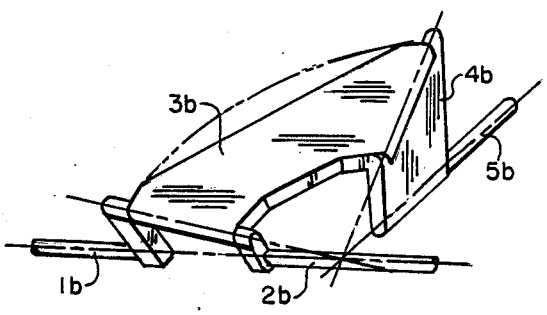
FIG. 2 is a perspective view showing a prior art modified conic linkage of that conic four link mechanism shown in FIG. 1.
Figure 3:
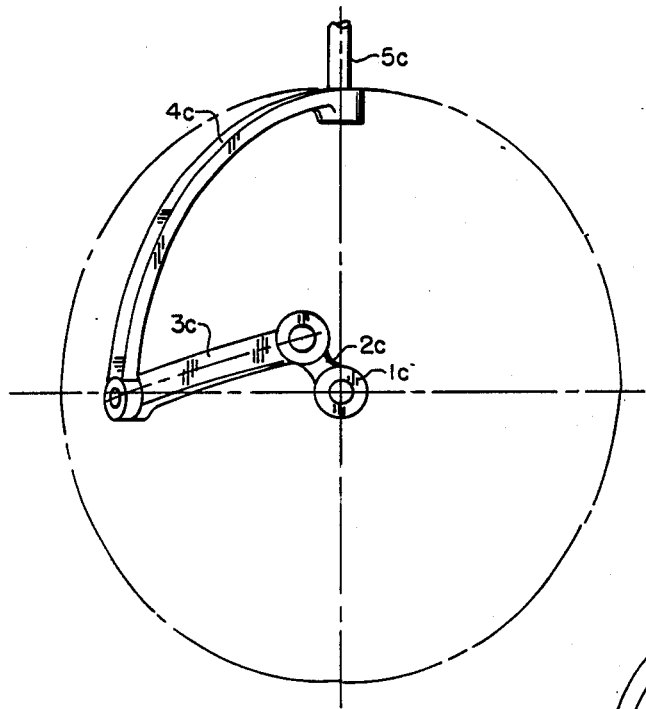
FIG. 3 is a perspective view showing a prior art conic slider-crank mechanism.

The mechanism in accordance with the present invention is of a class of mechanisms call kinematic mechanical space, or three-dimensional, motion translating mechanisms. Three prior art mechanisms are respectively shown in FIGS. 1-3. The mechanisms are all concerned with translating the angular rotation of a first, driving, shaft into the angular rotation of another, driven, shaft. A correspondence between equivalent driving and driven shafts, and between corresponding connecting elements, may be noted within each of FIGS. 1-3. FIG. 1a shows a conic, or spherical, form of a four link mechanism. FIG. 2 shows a modified conic linkage arrangement with extended pin connections. FIG. 3 shows a conic slider-crank design. Within each of the three prior art kinematic, space, mechanisms shown within FIGS. 1-3 a rotating input shaft $1a$, $1b$, $1c$ causes rotation of an input crank $2a$, $2b$, $2c$ to which it is affixed. The rotating input crank $2a$, $2b$, $2c$ is connected by a connecting rod $3a$, $3b$, $3c$ to an oscillating rockers $4a$, $4b$, $4c$. The movement induced in the oscillating rockers $4a$, $4b$, $4c$ by rotation of input shafts $1a$, $1b$, $1c$ translates into rotary motion of output shafts $5a$, $5b$, $5c$.

For those dimensional relationships between the rotating input cranks $2a$, $2b$, $2c$ and the oscillating rockers $4a$, $4b$, $4c$ which are shown within FIGS. 1-3, the angular motion induced in output shafts $5a$, $5b$, $5c$ will not be equal to the angular motion undergone by input shafts $1a$, $1b$, $1c$. Rather, for each full rotation of the input shafts $1a$, $1b$, $1c$, the output shafts $5a$, $5b$, $5c$ will undergo a predetermined angular displacement, which displacement will be repeated in a reciprocating manner with each rotation of the input shafts. The quantity, and the angular sense, of the angular motion induced in the output, driven, shaft can be made a predetermined function of the motion of the input, driving, shaft in accordance with the constructions of the kinematic mechanisms. The ability to realize some particular predetermined kinematic, space rotational motion transfer function will also be inherent in the kinematic mechanical space mechanism in accordance with the present invention.

Figure 4:
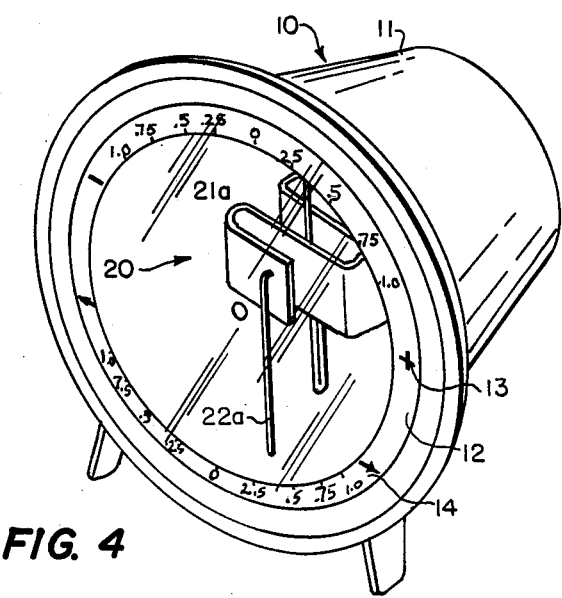
FIG. 4 is a perspective view showing a combination inclinometer and accelerometer apparatus, employing a kinematic mechanical space mechanism, wherein both apparatus and mechanism are in accordance with the present invention.

A pictorial view of the preferred embodiment of a pendulous accelerometer/inclinometer apparatus 10 in accordance with the present invention, within which apparatus a preferred embodiment of a kinematic mechanical space mechanism 20 in accordance with the present invention is used, is shown in FIG. 4. The preferred embodiment of the pendulous accelerometer/inclinometer apparatus 10 is primarily intended for use in land vehicles including automobiles. It measures longitudinal (along the wheel base of the automobile) inclinations and accelerations of magnitude less than a nominal ±1 "G". This "G" is relative to the G component holding the vehicle to the surface.

The accelerometer/inclinometer apparatus 10 is housed in a case 11, normally made of plastic, which is normally of approximate frustraconical shape diminishing from a diameter of approximately 4.75 inches to a diameter of approximately 3.0 inches over a height of approximately 4.25 inches. The case 11 mounts in a front bezel faceplate 12 which has an upper scale 13 which reads across an approximate 120 degrees arcuate segment the values −1.0 to +1.0 in increments of 0.25. The faceplate 12 also has a lower scale 14 which reads an oppositely-disposed approximate 120 degrees arcuate segment between a "left-tilt" 1.0 and "right-tilt" 1.0, also in increments of 0.25. The center region of faceplate 12 is typically entirely of clear plastic to expose the workings of the preferred embodiment of the kinematic mechanical space mechanism 20. Alternative constructions of faceplate 12 as partially opaque, translucent, or transparent are possible. However, in all constructions of faceplate 12 certain end tip regions, typically painted a readily visible color such as red, of a first wire 21 and of a second wire 22 (each part of the space mechanism 20) will be visible through a transparent region of the faceplate 12 as moving indicators that point toward and against the markings of scales 13, 14. A plate with "G" markings behind the indicators is another construction.

The indication of a first pointer that is formed by the tip end region 21a of wire 21 against the upper scale 13 is of longitudinal "G" forces. The longitudinal "G" forces represent the combinatorial acceleration/deceleration and incline/decline of the vehicle within which the apparatus 10 is mounted (with its faceplate 12 facing the driver and aligned nominally roughly perpendicular to the long axis of the vehicle). The longitudinal "G" force indications will be in a range from +1.0 "G" produced by acceleration and/or incline to −1.0 "G" produced by braking and/or decline. A +1.0 "G" force indication is obtainable by either heavy acceleration ranging in intensity to 1.0 "G" or by incline ranging to a 45° up angle, or by combinations of both acceleration and incline. A −1.0 "G" force indication is obtainable by heavy breaking ranging in intensity to −1.0 "G" or by decline ranging to a 45° down angle, or by combinations of both braking deceleration and decline. Similarly, the pointer formed by the tip end 22a of wire 22 will indicate against the scale 14 a lateral force ranging from left 1.0 "G" and/or left tilt ranging in angle to 45°, to a right 1.0 "G", representing right centrifugal force ranging in intensity to 1.0 "G" and/or right tilt ranging in angle to 45°.

In accordance with its construction, which construction involves a kinematic mechanical space mechanism 20 which will next be explained, the pendulous accelerometer/inclinometer apparatus 10 in accordance with the present invention is combinatorially responsive to both inclination angle and to acceleration in each of two planes. These planes are respectively orthogonal to the longitudinal and lateral axis of the apparatus 10. Each of the longitudinal, and lateral, acceleration/inclination response and indications is independent of the other. However, it should be recognized that a single acceleration or a spatial tilt to which the apparatus 10 is subject may involve both longitudinal and lateral components. For safety and practicality, the readings of apparatus 10 are always in relative "G" force, referenced on that effective "G" force component Gz which is normal to, and which holds a vehicle to, a ground surface. This is the essential information the vehicle operator needs and which would not be obtained from instruments which do not reference on Gz. The instrument reading is:

$$G \text{ indicated} = \frac{G \text{ acceleration} + G \text{ incline}}{Gz}$$

wherein G acceleration is the lateral or longitudinal acceleration as the case may be, G incline is the component of the gravitational force G which is parallel (in the lateral or longitudinal direction as the case may be) to the incline, and Gz is, as previously stated, the effective gravitational force G component that is normal to, and holding the vehicle to, the ground surface. Gz would also include centifugal forces, as on banked curves.

The combinatorial indication of both acceleration and inclination is easiest to understand by reference to the detection, and indication, of lateral acceleration. The wire 22, as may be best observed in FIGS. 5 and 6, serves as a pendulum in accordance with the well-known use of pendulums in pendulous accelerometers and in pendulous inclinometers. This use of wire 22 as an acceleration and inclination detector is in addition that the pointer end region 22a of the same wire 22 serves as an indicator. This combined functionality need not have been the case. However, in the preferred embodiment of the accelerometer/inclinometer apparatus 10 in accordance with the present invention, the wire 22 serves both as to indicate lateral roll as a pendulum and as an indicator of lateral acceleration, in "G's", relative to scale 14.

If the accelerometer/inclinometer apparatus 10 is elsewise level in the lateral, transverse, X axis, and if a 1.0 "G" left (+X Direction) centrifugal force were to be experienced, then the wire 22 would be subject, in its function as a pendulum, combinatorially to this lateral centrifugal force and also to a 1.0 "G" downward gravity vector. The vector sum of a left 1.0 "G" gravitational force vector will cause the pointer derived from wire end 22 to point in the southwest (225° clockwise) position of scale 14—exactly where the scale shows the left 1.0 "G" marking. Alternatively, it may be hypothesized that the accelerometer/inclinometer apparatus 10, and any vehicle in which the apparatus is affixed, is neither accelerating nor moving but is instead stationary upon a 45° right slope to the transverse (X) axis. In a vehicle this would occur if the vehicle were parked sideways, left-hand (driver's) side downward upon a steep, 45°, right slope. During such a tilted condition, the transverse, left, component of the lateral force on the vehicle is the gravitational vector (only) of 1.0 effective "G". The pointer will again assume the southwest position, and this effective force will be so indicated on the scale 14. A vector combination of forces resulting from both roll (the gravity force) and from transverse, sideways, acceleration (the centrifugal force) will produce a combined indication of the scale 14. This indication will be of the net effective lateral force seen by the vehicle, and transmitted laterally to the ground through the vehicle's tires or track.

The indication of longitudinal "G" force is likewise a vector combination of both longitudinal (forward-backward vehicular) accelerations, and of the inclination/declination of the accelerometer/inclinometer apparatus 10, and of the vehicle within which it is affixed.

Accordingly, the preferred embodiment of a pendulous accelerometer/inclinometer apparatus 10 in accordance with the present invention may be considered to perform purely as a two-axis inclinometer when it is not subjected to acceleration forces, displaying upon such times the absolute inclination of the apparatus relative to the local gravitational vector in each of two perpendicular axis. The apparatus 10 is calibrated by its construction relative to the horizontal in each of these two perpendicular axis, and will indicate zero inclination when it's internal mechanism is leveled in any flat plane which is orthogonal to the local gravitational vector. (Ultimately during discussion of FIG. 12 it will be appreciated that the housing 11 of apparatus 10 may assume a tilt even while the internal mechanism is "leveled".) When the apparatus 10 is accelerated in such a flat plane, then its indications will be purely of acceleration/deceleration forces along the two mutually perpendicular axis, and will contain no gravitational force component. In such conditions the apparatus 10 functions purely as an accelerometer.

Finally, when the apparatus 10 is both inclined and accelerated, then its indication in each of the two perpendicular axis will be of the combinatorial gravitational and accelerational forces. This is the preferred indication for safety and performance. It shows the true actual forces relative to the effective Gz force that is registered upon the vehicle and that is counteracted by the frictional resistance of the vehicle with the ground, normally through its tires or tracks. Because the point at which a vehicle becomes unstable, and losses adhesion (through its tires) to the road or ground surface is a function of the totality of those forces, resultant from both acceleration and gravitation relative to the effective Gz force component normal to the surface, which are acting upon the vehicle, it is appropriate that the combinatorial forces should be indicated. For example, during the operation of earth moving equipments (such as bulldozers) upon steep grades, it is important to know the effective "G" force which the equipment may be experiencing due to a tilted ground surface, as well as any (transient) forces due to equipment acceleration. For example, during the operation of an automobile on a racetrack the net effective relative "G" forces experienced in turns is of importance to assessing the thresholds of instability.

Figure 5:
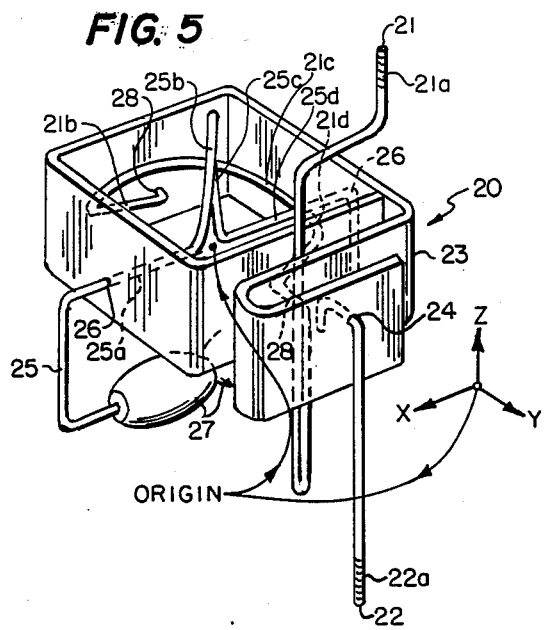
FIG. 5 is a left perspective view of a preferred embodiment of the kinematic mechanical space mechanism in accordance with the present invention.
Figure 6:
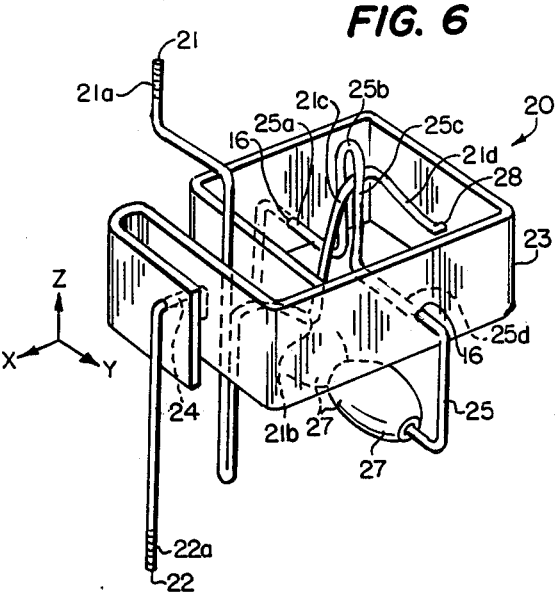
FIG. 6 is a right perspective view of the kinematic mechanical space mechanism in accordance with the present invention previously shown in FIG. 5.
Figure 7:
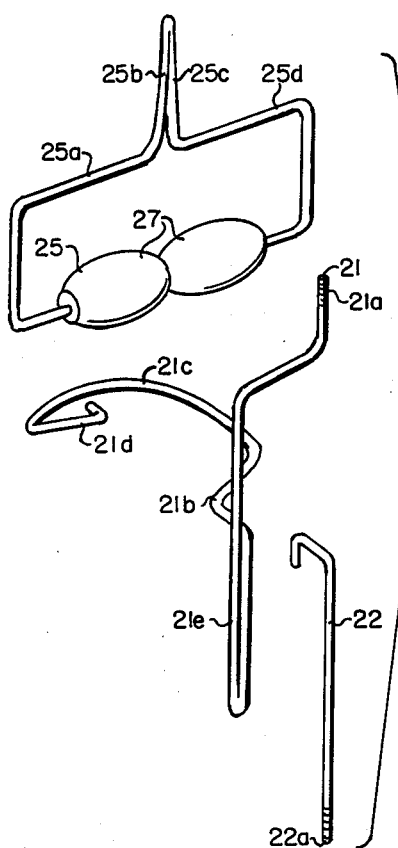
FIG. 7 is an exploded perspective view of the preferred embodiment of the kinematic mechanical space apparatus in accordance with the present invention.

A preferred embodiment of the kinematic mechanical space mechanism 20 in accordance with the present invention, particularly augmented and adapted for use in the preferred embodiment of an accelerometer/inclinometer apparatus 10 in accordance with the present invention, is shown in left perspective view in FIG. 5, in right perspective view in FIG. 6, and in exploded perspective view in FIG. 7. The kinematic mechanical space apparatus 20—plus certain augmentations thereto such as weights 27, wire 22, and the extension of wire 21 leading to its tip region 21a, which augmentations are all related to the accelerometer/inclinometer function—is based on a frame 23. The frame is nominally a simple strip (or two or more joined strips) of bent metal, which strip may be welded or brazed at the abutting surface of its one end in order to increase strength. The frame 23 is mounted (nominally by fasteners, preferably screws) to the housing 11 (shown in FIG. 4) at its rear surface. It supports the entire kinematic mechanical space mechanism 20.

Ancillary, and auxiliary, to the mechanical kinematic space mechanism 20 is the wire 22 which is supported for pivoting by its passage through bore 24 within by frame 23. The pivot axis of this first wire 22 is the Y axis or is an axis parallel to the Y axis. The first wire 22 pivots in response to gravitational and acceleration forces in an XZ plane (parallel to the XZ plane passing through the ORIGIN), and its displacement indicates the vector combination of these gravitational and accelerational forces in this plane. This XZ plane is the plane of that lateral, left-right, transverse, acceleration which is indicated by the tip end region 22a of wire 22 against the scale 14 of the faceplate 12 (shown in FIG. 4). The pivoting suspension of first wire 22 therefore constitutes a simple pendulous accelerometer, with the wire 22 serving as the pendulum. If desired in order to better overcome frictional forces within bore 24 to frame 23, the wire 22 can be made heavy, or can have a bulbous weight and/or pointer affixed at its end region 22a, or can otherwise be adapted for freely responsive pendulous movement in its XZ plane. For the intended vehicular application of the accelerometer/inclinometer 10, the rudimentary wire 22 passing through bore 24 and retained therein by a single bend at its terminal end region suffices quite well to responsively sense, and also indicate, lateral "G" forces. More sophisticated suspensions are possible but have not been found to be necessary. Grease at the location of bore 24 can add viscous damping as desired. (Grease with viscosity that is little affected by temperature, such as silicone grease, is preferred.)

Whereas indication of lateral acceleration in the XZ plane by a displacement of the pendulum formed from first wire 22 is substantially elementary, a more significant problem is presented concerning how to display in an XZ plane the acceleration occurring in another orthogonal plane. This translation of the combinatorial inclination/acceleration incurred in a first plane into a display of such inclination/acceleration in another, second, plane—which plane is orthogonal to the first plane—is accomplished by the kinematic mechanical space mechanism 20 in accordance with the present invention. Particularly, the wire 25 which is supported for pivoting by bores 26 within frame 23 constitutes the pendulum of a pendulous inclinometer/accelerometer. This pendulum moves, and is responsive to forces, in the YZ plane.

In order to help overcome the frictional resistance within bores 26, and more particularly within the linkages of the kinematic mechanical space mechanism 20 such as will be explained, the pendulum formed by wire 25 is not merely the wire itself as was the case with the pendulum formed by wire 22. Instead, the pendulum formed by wire 25 is normally affixed at its radial end extremity with weight, or mass, which is typically in the form of two spheroidal pellets, or weights, 27 which are typically made of lead. The absolute amount of this mass, or weight, 27 makes no difference to the operation of the accelerometer/inclinometer 10 in accordance with the present invention. It is used merely to help overcome friction. The movement of the weight 27 is restricted by its mounting upon wire 25 to transpire only within the YZ plane. The weight 27 is sensitive to the combinatorial inclination and acceleration forces in this plane. It is, of course, not sensitive to those forces in the orthogonal XZ plane to which the pendulum formed by wire 22 was sensitive.

In order to translate the motion undergone in plane YZ by that pendulum which is formed from wire 25 into a corresponding indication of such motion within an XZ plane parallel to the orthogonal plane XZ that passes through the ORIGIN, a kinematic, or space, mechanical motion translating mechanism is required. The kinematic mechanical space mechanism 20 in accordance with the present invention is based on a particular coupled interaction of bent regions of the wires, or shafts, 21, 25. The wire 21 is supported for pivoting by bores 28 within frame 23. The region of wire 21 which is between bores 28 traces a complex three dimensional spatial path. This path commences in segment 21b of wire 21 by proceeding essentially radially outward from a first point upon the Y axis. This part of the path proceeding radially outward extends to a predetermined radial distance of separation, essentially the linear length of segment 21b. The path then proceeds in segment 21c approximately as a helix—meaning a curve traced on a cylinder by the rotation of a point crossing its right section at a constant oblique angle—along an imaginary cylinder that is coaxial with the Y axis and which is of a radius substantially equal to the predetermined radial distance of separation. At an end point upon the helix, the path then bends and proceeds as segment 21d of wire 21 essentially radially inward from its predetermined radial distance of separation back to a second point upon this Y axis. This path of three segments 21b, 21c, 21d is symmetrical about its center point, or the ORIGIN. (The axes X, Y, Z should be understood to cross at the ORIGIN, and are displaced on FIG. 5 only for purposes of clarity.) The foregoing description of the path could be followed in reverse. However, the angular sense of the path is important to the directional sense in which rotations within the perpendicular planes will be kinematically coupled. Before the detailed path of the segments 21b, 21c, 21d to wire 21 is further discussed, the coupling of this path and these segments of the wire 21 to the wire 25 will be discussed.

The region of wire 25 which is between the bores 26, which bores 26 are along the X axis, likewise traces a complex three dimensional path. The path proceeds from a first one of the bores 26 along the X axis as wire segment 25a until a first point which is normally just before the intersection at the ORIGIN of the X and Y axes. At this first point the path proceeds essentially radially outward in wire segment 25b to a distance of radial separation from the X axis which is greater than that distance by which any portion of wire segment 21c is separated from the X axis or from the Y axis. The path of wire 25 then proceeds to cross over the helix portion 21c of the wire 21, and to proceed essentially inward from its predetermined greater radial distance of separation as wire segment 21c back to a second point essentially upon the X axis. From this second point the path proceeds via wire segment 25d to the second one of bores 26.

By the interlocking nature of the paths formed by wire segments 21b, 21c, 21d and 25a, 25b, 25c, there is a mechanical translation of the rotation undergone by that portion of the wire 25 which is along the X axis to the rotation which is undergone by that portion of wire 21 which is along the Y axis, and vice versa. The axial rotation undergone by either wire is translated, by action of the kinematic mechanical space linkage, into a corresponding angular axial rotation undergone by the other wire. The particular rotational sense and magnitude and offset of this three dimensional rotational motion translation is, for each rotational angle which is translated, a function of the particular paths of the wires 21, 25 along and by which their mechanical coupling is effected.

Figure 8:
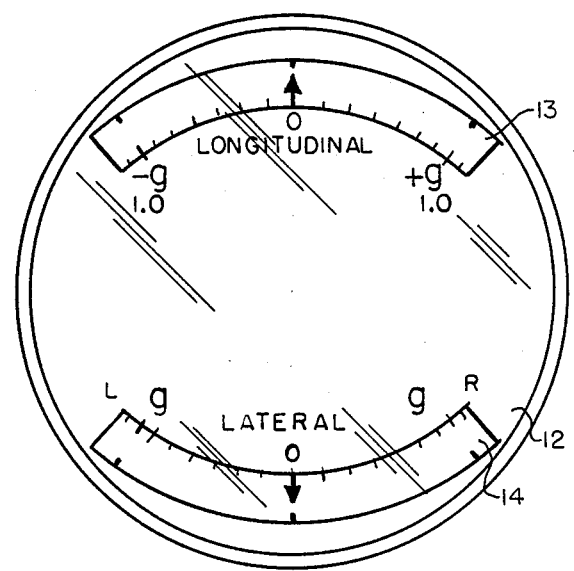
FIG. 8 is a front view showing the scales for indicating "G" forces of the preferred embodiment of the combination inclinometer and accelerometer in accordance with the present invention previously shown in FIG. 4.

The preferred contours of wires 21, 22, 25 are shown in exploded perspective view in FIG. 7. The wire 21 has the most complex form, incorporating a helix in its region 21c. It is normally formed by bending along a cylindrical jig in this region. Wire 21 also has an extension terminating in end region 21a which allows this end region 21a to appear closer to scale 13 as shown in FIG. 8. Since this extension is quite lengthy, a counterbalancing takeup loop is taken at region 21c of wire 21 in order that the entire wire 21 may be better balanced about its support axis established by bores 28 (shown in FIGS. 5 and 6).

It should also be recognized that alternative surfaces and contours allowing sliding engagement of the wires 21 and 25 are particular "arm" which is comprised of wire segments 25b, 25c. Alternative constructions of this "arm" are illustrated in FIGS. 11a through 11d. In the FIG. 11a, the "arm" of wire 25' is shown to terminated in an open-ended fork which recieves through its two tines 25b', 25c' the crossing wire segment 21c (shown in FIGS. 5 and 6). In FIG. 11b, the "arm" of wire 25'' is shown to terminate in a closed loop aperture formed from segments 25b'', 25c''. The wire 21 passes through this elongated aperture, which passage obviously requires an appropriately sequenced assembly of space mechanism 20. In FIG. 11c the wire 25''', presents two arms which may or may not be entirely in one plane. In FIG. 11d a wire 25'''' wherein the engagement region of the loop, or fork, is not in the plane of the weights 27 is shown. It is suggested that the wire 25'''' may be formed in two sections that are clenched in a rigid relationship. This wire is useful if the faceplate 12 (shown in FIG. 8) of an (longitudinal) accelerometer/inclinometer 10 is tilted upwards to better face a vehicle driver. This wire 25'''' shown in FIG. 11d is an example of how the motional translation performed the kinematic mechanical space apparatus 10 in accordance with the present invention need not be exclusively between orthogonal planes with vertical components, but can also be between any planes which are orthogonal.

It should further be recognized, even without benefit of illustration, that the weight(s) 27 could be disposed inboard or outboard of the closed loop of wire 25. In FIGS. 11a through 11c dual inboard weights 27 are illustrated. In FIG. 11d a single inboard weight 27' is illustrated. Obviously the lower region of wires 25 that is parallel to the X axis could extend outboards in either or both the +X and −X directions (in lieu of closing inwards, or in addition to closing inwards). Weight(s) could be affixed at such outboard extensions.

Figure 12:
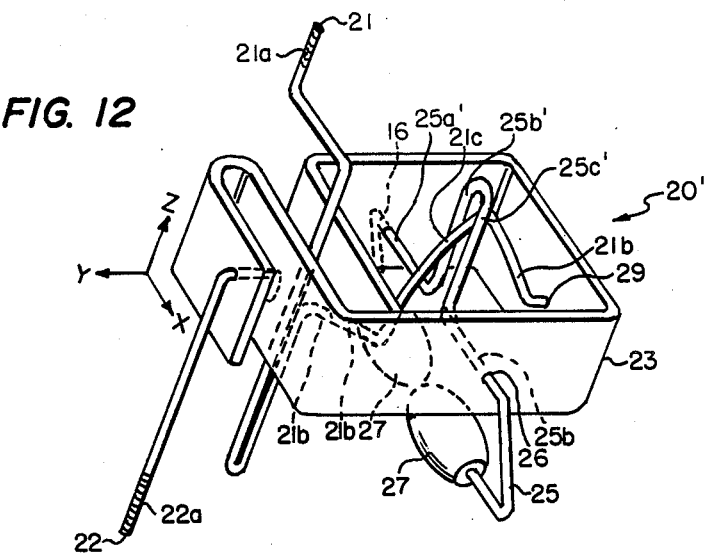
FIG. 12 is a right perspective view, similar to FIG. 6, showing the predetermined variable offset, or zero, that may exist between the first, driving, wire and the second, driven, wire within the preferred embodiment of the kinematic mechanical space mechanism in accordance with the present invention.

Finally, the concept introduced in FIG. 11d deserves further discussion. An entire kinematic space mechanism 20' where the "zero" calibration of longitudinal acceleration and inclination is set at, and while, frame 23 exhibits a fore-aft inclination, or tilt, is shown in FIG. 12. The calibration, or zero indication, of the longitudinal inclinometer and accelerometer in the present invention is a function of mechanism 20', and particularly of a bending of wire 25 not to lie in a single plane. By this construction the faceplate 12 of the longitudinal inclinometer and accelerometer may be conventiently tilted toward the driver while functional performance remains the same. Normally the tilt is not more than 5° to 10° or increasing penalties will be incurred in rendering the indications of lateral inclination and/or acceleration inaccurate.

Figure 13A:
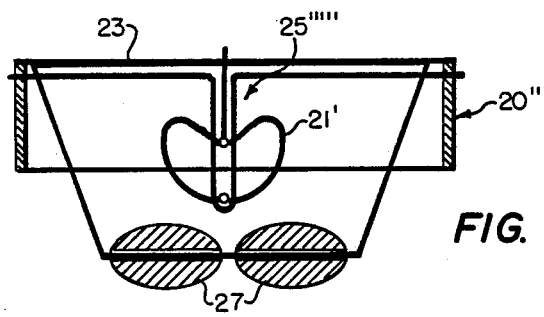
FIG. 13, consisting of FIGS. 13a and 13b, is a diagrammatic view of another embodiment of the kinematic mechanical space mechanism in accordance with the present invention wherein the extension regions of both driving and driven wires are directionally reversed from that embodiment illustrated in FIGS. 5 and 6.
Figure 13B:
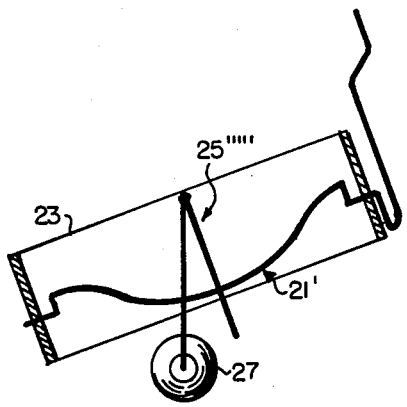

As further illustration that the kinematic motion translation performed by the mechanism in accordance with the present invention operates between any two orthogonal planes, and not only those with vertical components, consider FIGS. 13a and 13b. Another preferred embodiment of the kinematic space mechanism 20″ is illustrated wherein helix wire 21′ is inverted from wire 21 shown in FIGS. 5-7 while forked, or looped, wire 25″″ is likewise inverted from any of the wires 25 through 25″″ shown in FIGS. 5-7 and 11. The mechanism 20″ shown in FIG. 13 is more compact, and the direction of the helix in wire 21′ serves as a counterweight for needle end 21′a (equivalent to needle end 21a shown in FIGS. 5-7). By illustration of such variations it becomes obvious that the mechanical kinematic space mechanism in accordance with the present invention is more than a mere assemblage of oddly bent and interlocking wires, but instead represents an entire class of kinematic space apparatus.

Sliders and other types of mechanical mechanisms for coupling the motion of wires 21 and 25 to each other are possible. The spatial relationship and the contours of these wires, and the kinematic transfer function induced thereby, are generally more important than the particular scaling, thickness, pivot support, and/or linking region detail structure of the wires 21, 25 (excepting only that the wires should have minimal free play at their interfaces). This kinematic transfer function is discussed next.

There are great number of aspects to the interrelationship of the wires 21, 25 which are subject to variation, and which correspondingly vary the transfer function of the rotational motion translation. Amongst other variable aspects, (i) each indivudual wire exhibits an engagement contour which need not be symmetric in each of three axis, (ii) the wires need not be symmetrically disposed relative to each other's contours (whether symmetric or not) in each of three axis but can be "offset" from one another, and (iii) the translation need not be between mutually perpendicular axes. The generalized form of the kinematic mechanical space mechanism 20 in accordance with the present invention in consideration of each separate one of these variables rapidly becomes very complex. Luckily, many simplifications and symmetries inherent in the preferred embodiment are directed to realizing a well defined mathematical rotational transfer function. Recognizing what some of these symmetries are helps to understand how the mechanism could be alternatively constructed to realize another transfer function.

Particularly, the intersection point, or ORIGIN, between the X axis defined by bores 26 and the Y axis defined by bores 28 is located to be between those ends of the wire segments 25b, 25c which are not connected to each other. These wire segments 25b, 25c present a twisting constant width gap. At zero reading on the longitudinal scale the Z axis also passes through this point. This is diagrammed in FIG. 9. Comparing FIGS. 5, 6 to FIG. 9, it may be noted that the beginning of wire segment 21b, or the FIRST POINT upon the Y axis, is located at an approximately equal distance (+b) in a one (positive) direction along this Y axis from the spatially projected intersection of the Y axis and the X axis, or the ORIGIN, as is the distance (−b) of a SECOND POINT upon the Y axis from this same origin in the other (negative) direction along this Y axis. In other words, wire segments 21b and 21d are symmetrical, and are symmetrically disposed about the ORIGIN. Likewise, the points at which wire 25 departs from the X axis in wire segments 25b, 25c are also symmetrically disposed about the origin. This means that net rotation about the X axis, and in the YZ plane (incurred by wire 25) will be translated at the effective point of the ORIGIN into a counterpart rotation about the Y axis and in the XZ plane (incurred by wire 21), and vice versa. So far, nothing is said about the function, or sense of this rotational transference. It is merely established that it should be defined, and quantified, relative to the ORIGIN of both the X and Y axis. An axis parrallel to and below the described X axis (see FIG. 9) can generate a quantitatively different function.

The transfer function of the rotational coupling performed by the kinematic mechanical space mechanism 20 in accordance with the present invention is a function of the curvature, or contours, of the intersecting regions of wires 21, 25. Particularly, the wire segment 21c of wire 21 is in the shape of a helix, or a path which is everywhere equidistant from the Y axis. Moreover, at this equal distance the helical path will be at a constant oblique angle to the Y axis. This helical path of wire segment 21c couples the path, or arm, created by wire segments 25b, 25c. The rotational coupling of an equal angle at an equal distance means that the X axis rotation $\theta$ of wire 25 will be proportional to the arctangent of the Y axis rotation $\phi$ of wire 21. Thus the rotational transfer function of the preferred embodiment of the kinematic mechanical space mechanism 20 in accordance with the present invention is:

$$\phi \sim \tan \theta$$

It is also in the rotational sense, as may be oserved on scale 12 shown in FIGS. 4 and 8, that a clockwise rotation about the X axis (the movement of weight 27 in the negative Y direction) will induce a corresponding counterclockwise rotation of wire 21 (and its indicator tip region 21a) about the Y axis. Particularly if the directional sense of wire segments 21b, 21c, 21d was reversed, then the angular rotational translation performed by the kinematic mechanical space mechanism 20 would also be reversed.

The particular angular translation performed by the kinematic mechanical space mechanisms 20 in accordance with the present invention is a function of the curvature, or contours, of the bent wires 21, 25. The relationship of these bent wires in the preferred embodiment is illustrated in FIG. 10, which collapses to the YZ plane the complex paths of both wires 21, 25. Particularly in the preferred embodiment, output angle $\phi$ is proportional to the relative effective $G_x$ where:

$$\phi \sim G_x = G_z \tan \theta$$

Also, $$\tan \theta = Y/K$$

k′ and K are construction constants. Therefore, as $\phi$ is proportional to the Y distance from the ORIGIN to the intersection of fork and helix for a helix:

$$G_x = G_z k' \phi$$

wherein $G_z$ is the effective G. Generally, output angle $\phi$ is a function of $\theta$. In the preferred embodiment:

$$\phi = (1/k') \tan \theta$$

This gives a linear scale (needle position proportional to $G_x$); this also holds true for an axis parallel to and above or below the described axis (see FIGS. 9 and 13). Generally $\phi = f(\theta)$ where the function of $f(\theta)$ is determined by the shape of the angled wire.

Thus the bent wire linkages within the kinematic mechanical space mechanism 20 in accordance with the present invention allow of great flexibility in the angular rotational transfer function. This rotational transfer function can be of unitary magnitude, and can be in the rotational sense, as is shown in the preferred embodiment of the invention. Alternatively, the rotational transfer function can be of different magnitude and/or rotational sense. As regards realization of the transfer function, the wire members can be formed with any required degree of precision. The easy bending of the wire members allows intricate, and intricately variable, transfer functions which were not easily achievable in prior art kinematic mechanical space mechanisms.

On the other hand, there are frictional losses incurred between the sliding wire members of the present invention (which losses can, however, be substantially overcome with suitable materials, lubricants, and surfaces). Furthermore, the mechanism of the present invention is, at least in its more rudimentary wire-based forms, not directed to the transmission of high torque (although this also can be overcome by appropriately substantial structure). Finally, it should be recognized that in its preferred embodiment form, the kinematic mechanical space mechanism 20 in accordance with the present invention is very inexpensive of construction.

The mode and manner of operation of the kinematic mechanical space mechanism 20 in accordance with the present invention having been explained, the aggregate performance of the preferred embodiment of the pendulous accelerometer/inclinometer apparatus in accordance with the present invention may be further considered. It may now be recognized that this pendulous accelerometer/inclinometer apparatus 10 is indicating by deflection of an indicator element in an XZ plane, mainly the tip region 21a of wire 21, that pendulous acceleration/inclination which is undergone by a mass, mainly mass 27, which is accelerating and/or inclining in the YZ plane, orthogonal to the XZ plane.

In order to realize this display, by manner of a deflection of an indicator, in a one plane of an acceleration which is undergone by a mass in another plane, the pendulous accelerometer/inclinometer includes pendulous masses 27 which are suspended for pivoting in the YZ plane responsively to gravitational and/or acceleration forces. The pivoting of these masses 27 induces rotation of an X axis shaft, or wire, 25 responsively thereto. The kinematic mechanical space mechanism 20 translates this rotation of the X axis shaft 25 into a corresponding rotation of an Y axis shaft 21. A connected region 21a of this shaft 21 serves as an indicator element undergoing deflection in a XZ plane corresponding to the rotation of the shaft 21. (An XZ plane is any plane parallel to the XZ plane which contains the intersection of the X and Z axes at the ORIGIN.) By this much of the accelerometer/inclinometer mechanisms so far described in this paragraph, the detection of, and the indication of, longitudinal, fore-aft, combinatorial inclination and acceleration is performed.

The preferred embodiment of the inclinometer/accelerometer apparatus 10 in accordance with the present invention further incorporates another pendulous mass mainly the wire 22, supported for accelerating in the XZ plane and for inducing rotation in the Y axis shaft (which is the selfsame wire 22) responsively to such acceleration. Similarly as before, an indicator is integrally connected to this Y axis shaft. This indicator, or the end region 22a to wire 22, is actually the pendulous mass itself. It serves to indicate by its deflection the magnitude of the combinatorial acceleration and inclination vectors in the XZ plane.

In accordance with the preceding explanation, modifications and adaptation to both the inclinometer/accelerometer, and to the kinematic mechanical space mechanism contained therein, will suggest themselves to practitioners in the mechanical arts. For example, and in consideration of the fact that the rotational transfer function of the kinematic mechanical space apparatus may be in either direction, it is obviously possible that both indicator elements should point to separate scales in any directions and relative directions, or to the same scale which may be in any direction. In other words, the faceplate 12 of the inclinometer/accelerometer 10 in accordance with the present invention need not have separate curved scales 13, 14 for longitudinal and lateral acceleration, but could have a straight scale (which would be linear) to indicate lateral inclination/acceleration. (The present curved lateral inclination/acceleration scale is non-linear. The present longitudinal inclination/acceleration scale is preferably linear). This scale could be located at any orientation within an XZ plane, mainly at the top, at the bottom or even at a side.

For example, and in accordance with the realization that the angular transfer function of the kinematic mechanical space mechanism 20 may be widely tailored, the angular rotation undergone by each of the two shafts respectively indicate lateral and longitudinal inclination/acceleration may be in a wide latitude. The deflection of the pointers coupled to the shafts generally are not equal, and the scale divisions swept by such pointers (whether or not such scales are even at equal radius from the shaft axis) generally are not equal. Therefore, at the onset, a routineer in the mechanical arts can recognize that the external appearance, and the appearance of the scales, of the inclinometer/acceleration in accordance with the present invention could be considerable variant, and disparate, from the appearance of the preferred embodiment of the invention.

Futhermore, it is obvious that it need not invariably be that the lateral, side-to-side, inclination and acceleration is indicated directly while the longitudinal, fore and aft, inclination and acceleration is coupled for indication through the kinematic mechanical space mechanism 20. Rather the entire apparatus and mechanism in accordance with the present invention could be turned 90 degrees and the sense of the indications could be reversed (as would the viewing angle, now rotated ninety degrees).

Moreover, when it comes to forming the elements of the kinematic mechanical space mechanism 20, obvious variations present themselves. The entire area of the engagement of wire 21, 25 could be within, as opposed to without, the substantially rectangular area which is created by most of the wire 25 and weight 27. This could be accomplished either by altering the position of downhanging weights 27, or by reversing the Z axis directions of wire segments 21c, 25b, 25c in the YZ plane. The wire segment 21c could have been bent as a helix proceeding along an oblique angle until, at a region where the helix crosses the X axis, it would abruptly change direction by 90 degrees. This manner of linkage would mean that indicator needle could deflect in the same direction for both positive and negative longitudinal acceleration.

Once this, and like capabilities to transform the directional sense, magnitude, and visual nature of those indications which are derived from rotation are recognized, then it may readily be envisioned that an accelerometer-/inclinometer, or like device indicating angular rotation, might employ a plurality of kinematic mechanical space mechanisms in accordance with the present invention. The purpose of these plural mechanisms would be for scaling, and/or for application of other mechanical transfer functions as well as for the mere communication of motion between perpendicular planes. Indeed, a challenging mental exercise is to envision the construction of three kinematic mechanical space mechanisms in a series. By this combination a rotation in one plane might mapped through two other planes and returned through these other plane to the plane in which it originated. Moreover, it may be considered how the transfer function of each successive mechanism might change the rotation within each plane into which such rotation is translated. Similarly to certain predecessor mechanical kinematic space mechanisms, it is possible to rigorously apply mathematics to plan for the realization of an intended mechanical transfer function in use of the mechanism of the present invention. The physical realization of exotic transfer functions is particularly easy, essentially amounting to bending wire.

Corresponding to each obvious alterations and combinations, and corresponding to the diverse potential applications of the kinematic mechanical space mechanism in accordance with the present invention, the present invention of a kinematic mechanical space mechanism, and the inclinometer/accelerometer within which it is contained, should be interpreted in accordance with the following claims, only and not solely in accordance with the particular preferred embodiment within which the invention has been taught.

what is claimed is:

1. A pendulous accelerometer indicating by deflection of an indicator element in an XZ plane a pendulous acceleration undergone by a mass accelerating in a YZ plane that is orthogonal to the XZ plane, the accelerometer comprising:
   an X axis shaft, parallel to or coincident with an X coordinate axis;
   a first pendulous mass, affixed to the X axis shaft, moving in an arc due to an accelerating force in the YZ plane so as to induce rotation of the X axis shaft;
   a first member, affixed to the X axis shaft, defining at an extension from the X axis shaft and between two elements of the first member that are aligned approximately about radial lines from the X axis shaft a region that is capable of laterally interlocking a second member, the first member undergoing movement in the YZ plane corresponding to arcuate movement of the first pendulous mass;
   a Y axis shaft, parallel to or coincident with a Y coordinate axis;
   an angled helical second member in three dimensions and not in any one plane, affixed at two separated points to the Y axis shaft for an axis of rotation, and extending radially away from the Y axis shaft at these points until, a predetermined distance of separation having been reached, the second member runs along the length of the Y axis shaft at a pitch;
   the X axis shaft being located in an plane that is normal to the Y axis shaft and that intersects the Y axis shaft in the region of the second member;
   the second member laterally interlocked by the two elements of the first member's extended region so that movement of the first member and the two elements of its extended region responsive to X axis shaft rotation causes a corresponding rotation of the second member and of the Y axis shaft.

2. The pendulous accelerometer according to claim 1, with Z axis essentially plumb, further comprising:
   a second Y axis shaft, parallel to or coincident with the Y coordinate axis;
   a second pendulous mass moving due to an accelerating force in the XZ plane so as to induce rotation of the second Y axis shaft, to which it is affixed, that is perpendicular to the XZ plane; and
   a second indicator element within an XZ plane and connected to the second Y axis shaft for undergoing deflection in this XZ plane responsively to rotation of the second Y axis shaft.

3. The pendulous accelerometer according to claim 1 wherein the X axis is parallel to an X axis coplanar with the Y axis but is displaced away from the first member's extended region interlocking the second member, therein producing a larger rotation of the Y axis shaft for a given rotation of the X axis shaft than would be the case if the X axis were coplanar with the Y axis.

4. The pendulous acclerometer according to claim 1 wherein the X axis is parallel to an X-axis coplanar with the Y axis but is displaced towards the first member's extended region interlocking the second member, therein producing a lesser rotation of the Y axis shaft for a given rotation of the X axis shaft than would be the case if the axis were coplanar with the Y axis.

5. The pendulous accelerometer according to claim 1 wherein the first member's extended region is in the shape of a fork, which fork closely laterally interlocks the angled second member passing through the tines of the fork.

6. The pendulous accelerometer according to claim 1 wherein the first member's extended region is in the shape of an aperture defined by the first member, which aperture closely laterally interlocks the angled second member passing through the aperture.

7. The pendulous accelerometer according to claim 1 wherein the angled helical second member extends from the Y axis shaft in a three dimensional path which commences by extending essentially radially outward from a first point upon the Y axis shaft to a radial distance of separation therefrom, the path then extending approximately as a helix, meaning a curve traced on a cylinder by the rotation of a point crossing its right section at a constant oblique angle, along an imaginary cylinder coaxial with the first Y axis shaft and of a radius substantially equal to the radial distance of separation, the path then extending essentially radially inward from the radial distance of separation back to a second point upon the first Y axis shaft.

8. The pendulous accelerometer according to claim 1 wherein the rotation induced in the first Y axis shaft by the extended region of the first member interlocking the angled helical second member resultant to the rotation of the X axis shaft is proportional to the tangent of the angle of rotation of the X axis shaft;
   therein by the proportional rotation permitting any scale showing the rotation of the Y axis shaft to be linear with the tangent of the angle of rotation of the X axis shaft.

9. The pendulous accelerometer according to claim 1 wherein the relationship of the pendulous mass and the indicator element is such that movement of the pendulous mass in the YZ plane towards the spatial position of the indicator element causes a clockwise deflection of the indicator element in an XZ plane.

10. The pendulous accelerometer according to claim 1 wherein the indicator element comprises:
  a pointer needle.

11. The pendulous accelerometer according to claim 1 wherein the Z axis that is within the orthogonal YZ and XZ planes is plumb.

12. An inclinometer indicating, by deflection of an indicator element in an XZ plane, a tilt of the inclinometer in a YZ plane orthogonal to the XZ plane the inclinometer which tilts in one plane and indicates this tilt in another plane comprising:
  an X axis shaft;
  a mass suspended from the X axis shaft for pivoting in the YZ under force of gravity so as to induce rotation of the X axis shaft perpendicular to this YZ plane when the inclinometer is tilted in the YZ plane;
  a first member, affixed to the X axis shaft and extending therefrom to a region where it is capable of mechanically interlocking an element laterally traversing the region;
  a Y axis shaft;
  a helical second member, affixed to the Y axis shaft for mechanically interlocking the first member as the element laterally traversing its extended region for linearly translating the tangent of the angle of rotation of the X axis shaft into a corresponding angle of rotation of the Y axis shaft that is perpendicular to the XZ plane;
  an indicator element within an XZ plane connected to the Y axis shaft for undergoing deflection in the XZ plane responsively to rotation of the Y axis shaft.

13. The inclinometer according to claim 12 further comprising:
  a Y axis shaft perpendicular to the XZ plane;
  another mass suspended for pivoting under force of gravity in the XZ plane so as to induce rotation of the Y axis shaft; and
  another indicator element within an XZ plane connected to the Y axis shaft for undergoing deflection in the XZ plane responsively to rotation of the Y axis shaft.

14. The inclinometer according to claim 13 wherein the suspended mass is accelerated in the YZ plane to induce further, additive, rotation of the X axis shaft to that rotation induced by a tilt of the inclinometer in the YZ plane; and
  wherein the indicator element is undergoing deflection corresponding to combinatorial inclination gravitational vector in the YZ plane and acceleration in the YZ plane.

15. The inclinometer according to claim 14 wherein the indicator element indicates true acceleration in the YZ plane at any inclination of the suspended mass in the YZ plane.

16. The inclinometer according to claim 12 wherein the Z axis that is within the orthogonal YZ and XZ planes is plumb.

17. A pendulous accelerometer translating a pendulous acceleration of a mass in first plane into an indication of this acceleration, which indication is in a second plane orthogonal to the first plane, the accelerometer comprising:
  a mass suspended for pendulous movement in a first plane;
  a member, connected to the mass, defining an extended region which is capable of tightly interlocking a wire and which undergoes movement in the first plane corresponding to the movement of the pendulous mass;
  an angled wire in three dimensions and not in any one plane, which wire has and is supported for an axis of rotation wherein the axis is within the first plane, which wire tightly interlocks the member's extended region so that the movement of the member's region causes a rotation of the wire about its axis of rotation;
  an indicator connected to the wire so that rotation of the wire causes deflection of the indicator in a second plane orthogonal to the first plane;
  the member and the angled wire interlocking so that the tangent of an angular movement of the pendulous mass in an arc responsive to acceleration, causing a movement in the first plane of the member, results in a linear angular rotation of the wire, and a linear angular deflection of the indicator connected thereto.

18. The accelerometer according to claim 17 wherein the member comprises:
  a substantially linear extension arm extending in a one direction about a pivot axis from the mass which is suspended for pendulous movement about the pivot axis in another direction, and presenting the region which is capable of interlocking a wire at its terminus region.

19. The accelerometer according to claim 17 wherein the arm's terminus region is in the shape of a fork, which fork interlocks the wire between its tines.

20. The accelerometer according to claim 17 wherein the arm's terminus region is in the shape of an aperture defined by the arm, which aperture interlocks the wire which passes therethrough.

21. A combination inclinometer and accelerometer, comprising:
  a frame supporting a first Y axis shaft, a second Y axis shaft, and an X axis shaft;
  a first pendulous mass angularly pivoting in the YZ plane about the X axis shaft causing rotation of this X axis shaft, the amount of angular pivoting being the vector sum of a component in the YZ plane of a gravitational vector and a component in the YZ plane of an acceleration vector both acting upon this first pendulous mass;
  a second pendulous mass pivoting in the XZ plane about the second Y axis shaft causing rotation of this second Y axis shaft, the amount of angular pivoting being the vector sum of a component in the XZ plane of the gravitational vector and a component in the XZ plane of an acceleration vector both acting upon this second pendulous mass;
  a first member affixed to and a extending esentially radially from the X axis shaft until presenting and defining, at a separation from the X axis shaft, a region that is capable of mechanically interlocking an element that passes through the region;

a second, helical, member affixed to and extending from the Y axis shaft until presenting and defining, at a substantially uniform separation from the Y axis shaft, a portion of a helix substantially axially centered about the Y axis shaft, this helical portion passing through and interlocking the region of the first member so that the tangent of the angle of rotation of the X axis shaft is translated into corresponding rotation of the first Y axis shaft;

wherein the component in the XZ plane of the gravitational vector, or inclination in the XZ plane, plus acceleration in the XZ plane are combinatorially resultant in rotation of the second Y axis shaft that is linear with the XZ plane inclination gravitational vector and acceleration; and wherein the component in the YZ plane of the gravitational vector, or inclination in the YZ plane, plus acceleration in the YZ plane are combinatorially resultant in rotation of the first Y axis shaft that is linear with the YZ plane inclination gravitational vector and acceleration.

22. The combination inclinometer and accelerometer according to claim 21 further comprising:

a first indicator in an XZ plane affixed to the first Y axis shaft for indicating the rotation of the first Y axis shaft; and a second indicator in the XZ plane affixed to the second Y axis shaft for indicating the rotation of the second Y axis shaft.

23. A method performed in an inclinometer/accelerometer of linearly indicating in single plane the combined gravitational and acceleration vector at and along each of two mutually orthongonal planes of the inclinometer/accelerometer, one of which planes is the plane of the indicating and the other of which planes is orthogonal to the plane of the indicating, the method of linearly indicating the combined gravitational and acceleration vector in an inclinometer/accelerometer comprising:

suspending a first pendulous mass for pivoting about an X axis shaft in a YZ plane, orthogonal to the XZ plane of the indicating, in response to the combined gravitational and acceleration vector in this YZ plane;

mechanically linearly translating in a kinematic mechanically space mechanism the arcuate motion of the first pendulous mass, which motion is in the YZ plane, into a rotational motion in the YZ plane, the translation transpiring by means of a first member affixed to the X axis shaft and extending therefrom that interlocks at its end region extended from the X axis shaft a second, helical, member that is connected to a Y axis shaft in the YZ plane and that extends therefrom so that, by the interlocking, the tangent of an angle of arcuate motion of the first pendulous mass lateraly couples an associated angular rotation of the Y axis shaft;

first coupling this rotational motoin of the Y-axis shaft in the YZ plane of the indicating to produce an indicating in the XZ plane of the first pendulous mass motion;

suspending a second pendulous mass for pivoting in a plane parallel to or coincident with the XZ plane of the indicating respectively to the combined gravitational and acceleration vector in this plane of the pivoting;

second coupling the motion of the second pendulous mass, which motion is in the plane parallel to, or coincident with the XZ plane of the indicating, to produce in the XZ plane an indication of this second pendulous mass motion;

wherein the indication of the first mass motion, and the indication of the second mass motion, are both within the XZ plane of the indicating, although each indication is representative of a combined gravitational acceleration vector which is within a plane orthogonal to the plane of the other;

wherein gravitation/acceleration occurring in each of two orthogonal YZ and XZ planes is indicated in one XZ plane.

* * * * *